US012336054B2

(12) United States Patent
Menon

(10) Patent No.: US 12,336,054 B2
(45) **Date of Patent: *Jun. 17, 2025**

(54) UNIVERSAL INTEGRATED CIRCUIT CARD-BASED QUALITY OF SERVICE ALLOW/DENY REGISTRATION FOR ROAMING

(71) Applicant: AT&T Intellectual Property I, L.P., Atlanta, GA (US)

(72) Inventor: Sreejith Menon, Herndon, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,688

(22) Filed: Jan. 11, 2024

(65) Prior Publication Data

US 2024/0147209 A1 May 2, 2024

Related U.S. Application Data

(63) Continuation of application No. 17/521,967, filed on Nov. 9, 2021, now Pat. No. 11,910,476.

(51) Int. Cl.

| | |
|---|---|
| ***H04W 8/08*** | (2009.01) |
| ***H04W 4/10*** | (2009.01) |
| ***H04W 48/16*** | (2009.01) |
| ***H04W 84/04*** | (2009.01) |

(52) U.S. Cl.

CPC ............... *H04W 8/08* (2013.01); *H04W 4/10* (2013.01); *H04W 48/16* (2013.01); *H04W 84/042* (2013.01)

(58) Field of Classification Search

CPC ......... H04W 8/08; H04W 4/10; H04W 48/16; H04W 84/042

See application file for complete search history.

(56) References Cited

U.S. PATENT DOCUMENTS

| | | | | |
|---|---|---|---|---|
| 11,910,476 | B2 * | 2/2024 | Menon .................. | H04W 48/18 |
| 2022/0360461 | A1 | 11/2022 | Raleigh et al. | |
| 2023/0090934 | A1 * | 3/2023 | Menon .................... | H04W 8/08 726/3 |
| 2023/0142156 | A1 | 5/2023 | Menon | |

OTHER PUBLICATIONS

QoS Class Identifier, Wikipedia, https://en.wikipedia.org/wiki/QoS_Class_Identifier printed Nov. 2, 2021, pp. 103.

* cited by examiner

*Primary Examiner* — Diane D Mizrahi

(74) *Attorney, Agent, or Firm* — Guntin & Gust, PLC; John G. Rauch

(57) ABSTRACT

Aspects of the subject disclosure may include, for example, registering a mobile device with a mobile communication network as a roaming network, the roaming network communicating with a home network associated with the mobile device to complete the registering, initiating access to a service on the roaming network, retrieving information about access permission status of the service for the mobile device on the roaming network; responsive to the information about access permission status of the service having a value that corresponds to denial of the service on the roaming network because the service is not approved for operation on the roaming network, providing an indication to a user of the mobile device that the service is not available, and suspending further access to the service on the roaming network. Other embodiments are disclosed.

20 Claims, 8 Drawing Sheets

200

600

UNIVERSAL INTEGRATED CIRCUIT CARD-BASED QUALITY OF SERVICE ALLOW/DENY REGISTRATION FOR ROAMING

CROSS REFERENCE TO RELATED APPLICATIONS

This application is a continuation of U.S. patent application Ser. No. 17/521,967 filed on Nov. 9, 2021. All sections of the aforementioned application are incorporated herein by reference in their entirety.

FIELD OF THE DISCLOSURE

The subject disclosure relates to Universal Integrated Circuit Card (UICC)-based quality of service (QoS) allow/deny registration for roaming in mobile networks.

BACKGROUND

In mobile communication networks, a mobile device can access a service or facility that runs on a core network of a service provider. Further, the mobile device can roam to a network of another provider and may seek to access the same service or facility at the roaming network.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for extending use of services or applications from a cellular provider's home network to a roaming network. Some of the applications and services are focused completely on, for example, low latency applications which have relatively high-priority quality of service class indicators (QCI). Home network operators develop the new applications to work on the home network but extending a new application to a partner or roaming network, with low hops in the partner network to maintain the required low latency, for example, has been a challenge. The ability to identify from the entry point and reject or allow the application is essential as the industry looks towards implementation of low latency applications and other high QCI use cases. Other embodiments are described in the subject disclosure.

One or more aspects of the subject disclosure include detecting available mobile communication networks, registering with one mobile communication network of the available mobile communication networks as a roaming network, wherein the roaming network is in data communication with a home network of the mobile communication device, detecting initiation of an application at the mobile communication device, wherein the application requires a predetermined quality of service level, retrieving, from a subscriber identity module (SIM) of the mobile communication device, permission information which relates one or more applications with a current access permission status for one or more networks including the roaming network, and determining a current access permission status for the application on the roaming network. Aspects of the invention further include, responsive to the application having a current access permission status corresponding to denial of the application, providing an indication to a user of the mobile communication device that a service associated with the application is not available.

One or more aspects of the subject disclosure include registering a mobile communication device with a mobile communication network as a roaming network, wherein the roaming network is in data communication with a home network of the mobile communication device to facilitate the registering, launching an application on the processing, wherein the launching is responsive to a command of a user of the mobile communication device, and retrieving from storage information about a current access permission status of the application on the roaming network. Aspects of the subject disclosure further include responsive to the application having the current access permission status corresponding to denial of the application, providing an indication to a user of the mobile communication device that a service associated with the application is not available, and suspending further operation of the application to access the roaming network.

Figure 1:
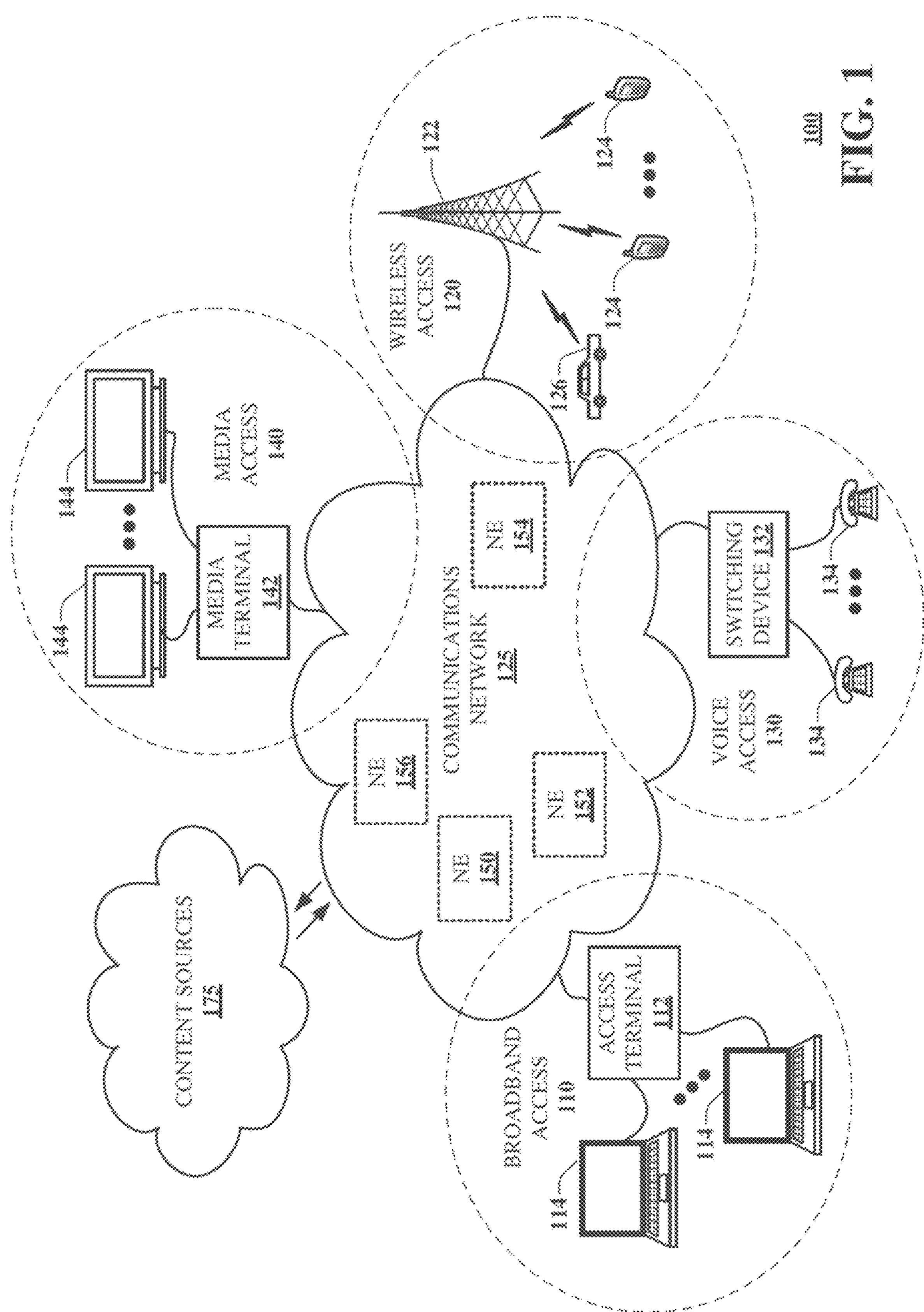
FIG. 1 is a block diagram illustrating an exemplary, non-limiting embodiment of a communications network in accordance with various aspects described herein.

One or more aspects of the subject disclosure include registering a mobile device with a mobile communication network as a roaming network, the roaming network communicating with a home network associated with the mobile device to complete the registering, initiating access to a service on the roaming network, retrieving information about access permission status of the service for the mobile device on the roaming network; responsive to the information about access permission status of the service having a value that corresponds to denial of the service on the roaming network because the service is not approved for operation on the roaming network, providing an indication to a user of the mobile device that the service is not available, and suspending further access to the service on the roaming network Referring now to FIG. 1, a block diagram is shown illustrating an example, non-limiting embodiment of a system 100 in accordance with various aspects described herein. For example, system 100 can facilitate in whole or in part a process of registering a mobile device on a mobile communications network operating as a roaming network for the mobile device, determining locally at the mobile device if an application is not permitted by the home network associated with the mobile device to run on the roaming network, and suspending access to the application if the application is not permitted on the roaming network. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
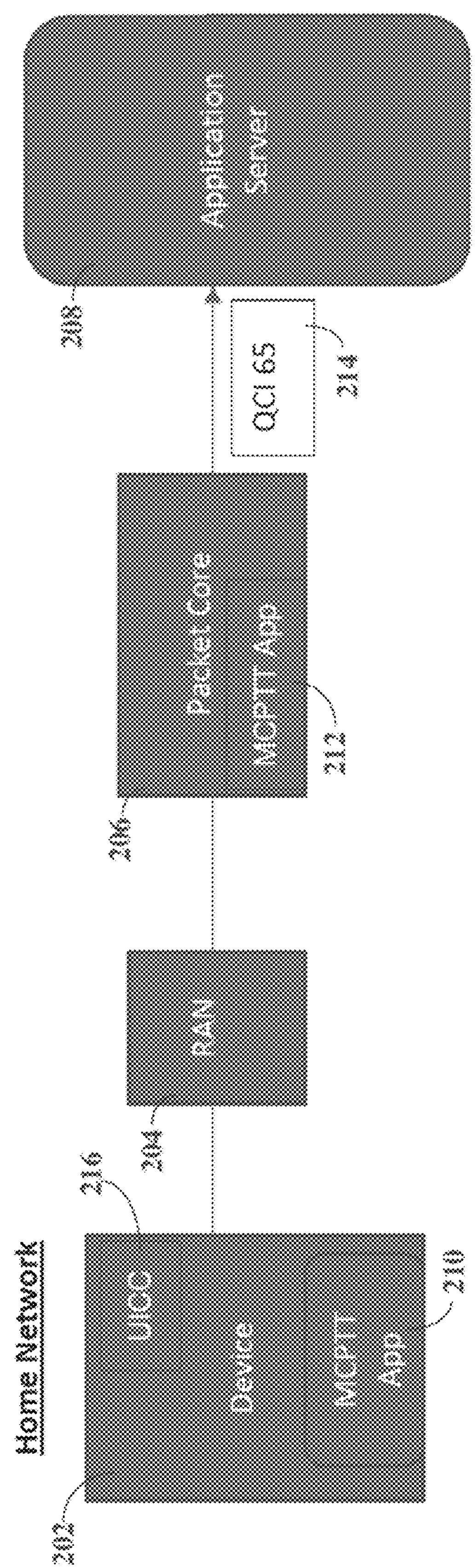
FIG. 2A is a block diagram illustrating an example, non-limiting embodiment of a mobile communication system functioning within the system of FIG. 1 in accordance with various aspects described herein.

FIG. 2A is a block diagram illustrating an example, non-limiting embodiment of a mobile communication system 200 functioning within the system 100 of FIG. 1 in accordance with various aspects described herein. Mobile communication system 200 may employ features and aspects of wireless access 120 in conjunction with communications network 125. Mobile communication system 200 in the illustrated exemplary embodiment includes a mobile device 202, a radio access network or RAN 204, a packet core network 206 and an application server 208. Other embodiments may include other or additional features as well.

The mobile device 202 is an example of a device that communicates with the RAN 204. The mobile device 202 generally includes a transmitter and receiver for radio communication with the RAN 204. In embodiments, the mobile device 202 may include other data processing systems, a user interface including a display, keyboard, microphone, speaker, and other controls. The mobile device 202 may be embodied as a smartphone, for example, or another device which incorporates similar functionality such as a tablet computer, a laptop computer or other device.

The mobile device 202 in various embodiments includes a processing system including one or more processors and memory. The memory stores data and instructions to control operation of the one or more processors. The processing system enables a user of the mobile device 202 to activate and interact with various applications programs, also referred to as applications or apps. An application may incorporate any type of functionality for the user. An application may include communications functionality in which the application exchanges data with a remote source and destination. Further, the mobile device 202 incorporates features that permit voice communication by the user with remote users accessible over the mobile communication system.

The RAN 204 includes a number of base stations or evolved node B devices generally referred to as eNodeB. In the example of FIG. 2A, the RAN 204 may include any number of eNodeB devices. Generally, each respective eNodeB provides radio communication service to mobile devices such as mobile device 202 for a respective geographic area near the eNodeB. As the mobile device 202 travels through a region, communication may be handed off from one eNodeB to another eNodeB to enable mobility. Communication may include a voice call, a data call or other communications. Generally, all communications between the mobile device 202 and an eNodeB are arranged in data packets according to a communication protocol such as Internet Protocol (IP) or Voice Over IP (VoIP).

Communication between the mobile device and the RAN 204 may be supervised by or controlled by elements of the packet core 206. The packet core network 206 provides supervisory and control operations for a portion of a RAN or all of a RAN such as RAN 204 and may be accessible by more than one RAN. In the illustrated example, the RAN 204 is in data communication with the packet core network 206.

The packet core network 206 may interact with the application server 208 to provide additional functionality for network devices such as the mobile device 202. The application server 208 stores and provides access to various applications programs, also referred to as applications or apps. An application may incorporate any type of functionality for the user of a network device such as mobile device 202. An application may include communications functionality in which the application exchanges data with a remote source and destination. An application may provide services related to or different from standard available services of the core network 206. An application program accessible through the application server 208 may provide enhanced or modified services for a user or mobile device 202. Access to such applications and services may be through a subscription of the user or the mobile device 202 of the user. An example of an application stored in the application server 208 is a push-to-talk function available to users of the communications network 200 who access the RAN 204 via a mobile device 202.

The RAN 204 operates according to an air interface standard. The air interface standard defines details of radio communications between mobile devices such as the mobile device 202 and other equipment such as each eNodeB. The air interface standard defines signaling, for example, for initiating radio communication, terminating communication and handover of communication. Examples of air interface standards and communications may include various cellular and radio communications systems, such as third generation cellular or 3G, fourth generation cellular or 4G, long-term evolution or LTE, fifth generation cellular or 5G, 5G new radio (NR) and others as well, including those currently existing or developed in the future. Generally, equipment maintains backward compatibility so that a 4G base station that has been in service for a few years can reliably communicate with a new 5G mobile phone such as mobile device 202.

Multiple radio access networks may overlap and provide different types of service to mobile devices such as mobile device 202 in the same or different regions. The multiple radio access networks may be operated by one service provider. Moreover, the multiple radio access networks may be operated by different service providers. The different service providers have contracts with customers to enable mobile devices of the customers to access the mobile communications network of the service provider. Based on the service contract, the mobile device 202 seeking access to the mobile communications network 200 is granted access to all features or a subset of features of the mobile communications network 200.

For various reasons including convenience of users of mobile devices such as mobile device 202, the different service providers may have in place roaming agreements. A roaming agreement enables a mobile device such as mobile device 202 to access a mobile communications network with which the user of the mobile device does not have a service contract. The mobile communications network 200 operated by the service provider with which the user of the mobile device 202 has a service contract may be referred to as the home network, operated by the home network operator. A mobile communications network operated by a service provider with which the home network operator has a roaming agreement and accessed by the mobile device 202 may be referred to as a roaming network from the perspective of the mobile device 202. The mobile device 202 may attach to and communicate with a roaming network and use such facilities of the roaming network as are defined by the roaming agreement. The operator of the home network and the operator of the roaming network may be referred to as roaming partners.

Network operators or service providers generally develop new products for users and mobile devices on their networks. Such products include voice calls and data sessions. Such products may include an application that runs on the packet core network 206 of the network operator. Generally, the network operator will design the product for the home network, such as mobile communication system 200, and optimize and improve the product for the home network. Subsequently, once the product matures on the home network the network operator may launch the product on the networks operated by roaming partners of the network operator. In that way, the users can get access to the product or service when operating outside the range of the home network, on a roaming network. For example, a product involving a voice call implemented by a US network operator may be available to US customers when they travel to Canada due to interoperability agreements including roaming agreements between the US network operator and the Canadian network operator. Published standards, such as standards published by the 3$^{rd}$ Generation Partnership Project (3GPP) may control operation of the two networks together.

Some products offered to network customers will have different operational requirements. For example, 5G cellular products may require very low latency. Latency is the time difference between activation of the product by the user at a mobile device and response by the network. Another example is mission critical applications which are being developed for first responders for emergencies or other situations that need highly reliable service. An example is the FirstNet network operated by AT&T Corp. as a wireless, nationwide communications platform for first responders and the public safety community. For such low-latency and mission critical applications, roaming networks may not support or have similar products available. Thus there is a requirement for the user seeking to access a service on a roaming network to control the service directly from the mobile device 202 or other user equipment.

One example of such a service or product is a mission critical (MC) push-to-talk (PTT) service. Push-to-talk is a service in which a mobile device operates like a walkie-talkie. Users may be organized in a group or team. Upon actuating a switch such as a push-switch on the mobile device, a user is able to talk directly to all members of the group or team in a broadcast fashion, without having to initiate a call to each respective team member. Generally, the mobile device of each user of the group remains in a voice reception mode. Pressing the push-to-talk button switches the user's device from the voice reception mode to transmit mode while the button is pressed. The device may operate in half-duplex mode during the time, but PTT button is pressed. A significant advantage of PTT is the ability for a single person to reach an active talk group with a single button press. Such a PTT capability can be very useful for public safety professionals who need to coordinate operations among team members, some of whom may be at remote or distant sites.

In an embodiment, the MC PTT service includes a mobile MC PTT application 210 operable on mobile devices such as mobile device 202 of members of the group and a core MC PTT application 212 operable in the packet core network 206. The core MC PTT application 212 cooperates with multiple instances of the mobile MC PTT application 210 to implement the mission critical push-to-talk function among the group members.

In some embodiments, information about the subscriber and the subscription to the MC PTT service, and other subscription information, may be stored on a Universal Integrated Circuit Card 216 of the mobile device 202. The UICC 266 is the software component, including instructions, logic and data, of a subscriber identity module (SIM). The UICC 216 includes information stored in the SIM, for example. For example, the UICC 216 identifies the subscriber to the subscriber's wireless network operator so the network operator can identify the user's subscription plan and services. The UICC 216 can store personal information such as contacts and enables a secure and reliable voice and multi-media data connection, and global roaming. The UICC can store multiple applications for the user and the mobile device. Such applications include, for example, UMTS Subscriber Identity Module (USIM) and Integrated SIM (ISIM) for secure mobile access to multimedia services, and non-telecom applications such as payment. In embodiments, an ISIM may integrate a microcontroller unit, a cellular modem, and SIM identity into one system-on-chip (SoC).

The UICC, including information stored on the UICC, is used to identify the identity of the mobile device. The UICC is used to look a network identity to access, and to ensure that the device can attach to the network. The UICC further includes security features to ensure that the device can securely attach to the network.

As a mission critical element, the MC PTT service is very sensitive to latency. Latency may be the time difference between activation of the service by a user at a mobile device to begin a PTT message and the time at which the application becomes active and conveys the PTT message to other group members. This may be referred to as mouth-to-ear latency, referring to the time delay between a time when the speaker talks and other parties hear. Because group members such as first responders or public safety guardians may need to communicate rapidly and urgently, the PTT service should respond very rapidly, even instantaneously, when activated. Packets involved in messaging between the mobile device 202 and the RAN 204, and between the RAN 204 and the packet core 206, should be identified so that the network ensures the packets arrive with little or no delay or latency, and taking as few hops between routers or network nodes as possible. The PTT service should be given a very high priority.

One way to control the priority of messaging in a mobile communications network such as mobile communications network 200 is through a quality of service (QoS) tag or indicator for a message conveyed in the network. Different carrier traffic in a network requires different QoS and therefore different priorities. Quality of Service (QoS) in cellular networks is defined as the capability of a cellular service provider to provide a satisfactory service which includes voice quality, signal strength, low call blocking and dropping probability, high data rates for multimedia and data applications etc. Factors affecting QoS include throughput, or the rate at which packets pass through the network; delay, or the time required for a packet to travel through the network; packet loss rate; packet error rates; and reliability.

A mechanism is needed to classify the different types of carriers into different classes, with each class having appropriate QoS parameters for the traffic type. In an LTE or 4G cellular system, a QoS class identifier or QCI is defined. In a 5G cellular system, a 5G QoS identifier or 5QI is defined. The QCI is a scalar that is used within the access network as a reference to node-specific parameters that control packet forwarding treatment, for example scheduling weight, admission thresholds and link-layer protocol configuration. The QCI is also mapped to transport network layer parameters in core nodes of an Evolved Packet Core (EPC) such as the packet core 206. QCI values are standardized and associated with QCI characteristics in terms of packet forwarding treatment that the carrier traffic receives edge-to-edge between the mobile device and a packet gateway to other networks such as the public internet. Some of the set of characteristics defined by the 3GPP standard include scheduling priority, resource type, packet delay budget and packet error loss rate. 5QI values are similarly defined for a 5G network.

In an example, a mission critical push-to-talk (PTT) service is defined to have a QCI value of 65. Every QCI value is associated with a priority level and MC PTT service is associated with a priority level of 0.7. For comparison, non-mission-critical PTT service is defined to have a QCI value of 66 and a priority level of 2; conversational voice messaging such as Voice over LTE or VoLTE is defined to have a QCI value of 1 and a priority level of 2; conversational video (live streaming) is defined to have a QCI value of 2 and a priority level of 4; and real-time gaming is defined to have a QCI value of 3 and a priority level of 3. In current systems, 0.5 is the highest priority level. If congestion is encountered, the lowest priority level traffic, meaning the highest priority number, would be the first to be discarded or delayed in favor of higher priority level traffic.

In an example, an MC PTT service has been developed in which a user's mobile device 202 employing the mobile MC PTT application 210 attaches to the RAN 204. Attachment of the mobile device 202 to the RAN 204 is done according to the controlling air interface standard, for example. The device and the application are assigned a higher QCI and get served by the packet core 206 and the core MC PTT 412. In the example of FIG. 2A, the packets are assigned a QCI value 212 of 65. In this example, using the MC PTT service on the user's home network, such as mobile communication system 200, works very well with acceptable latency.

However, while the home network has been designed to support the service, when the user with the mobile device 202 and the mobile MC PTT application 210 roams on a partner network, the home network including the core MCC PTT application 212 may not function properly when the service is initiated through the roaming network.

Figure 2B:
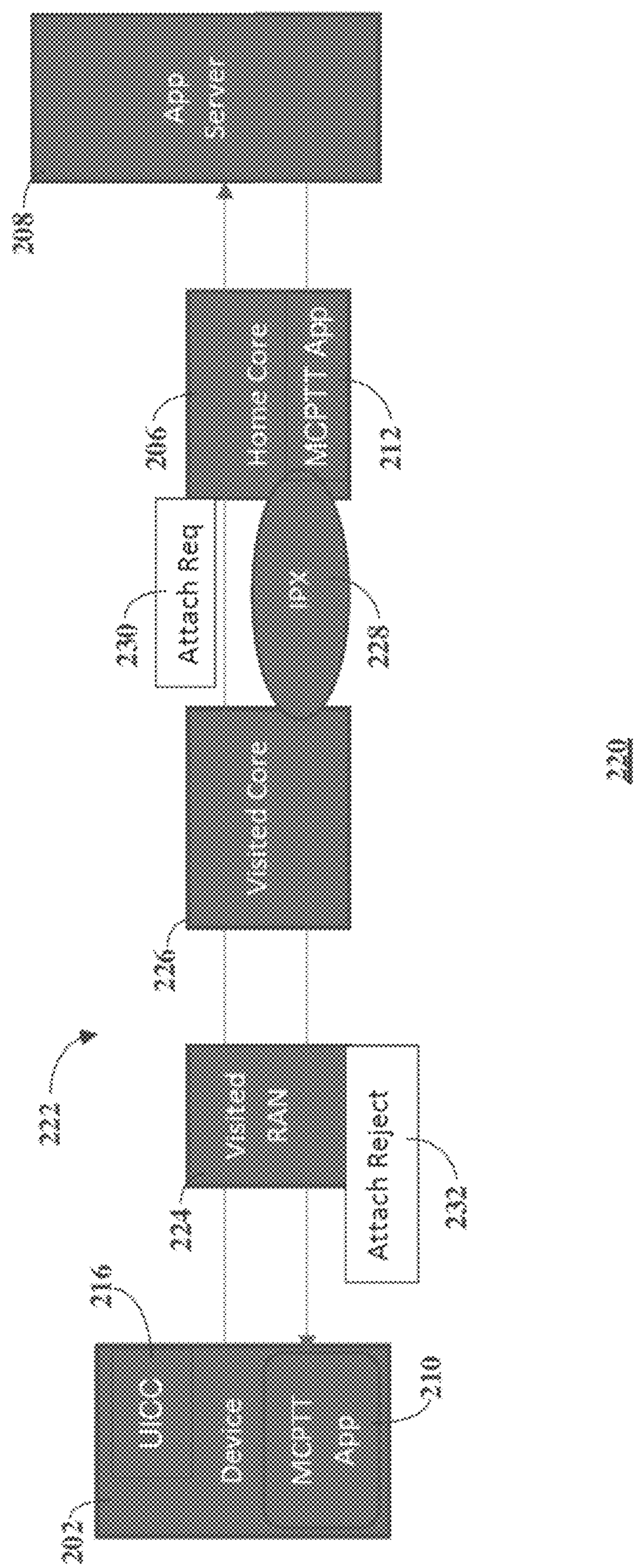
FIG. 2B is a block diagram illustrating an example, non-limiting embodiment of a mobile communication system functioning within the system of FIG. 1 in accordance with various aspects described herein.

FIG. 2B is a block diagram illustrating an example, non-limiting embodiment of a mobile communication system 220 functioning within the system 100 of FIG. 1 in accordance with various aspects described herein. In FIG. 2B, a mobile device 202 accesses a mobile communications network 222. The mobile communication network 222 includes a radio access network (RAN) 224 and a packet core network 206.

From the perspective of the mobile device 202 in FIG. 2B, the mobile communication system 222 is a visited network or a roaming network. The RAN 224 is a visited RAN and the packet core network 226 is a visited core. The mobile device 202 has a home network including RAN 204, packet core network 206 and application server 208. In the example, the home network has a roaming agreement, an interoperability agreement or similar arrangement to allow the mobile device 202 to register with and attach to the RAN 224 of the visited network, mobile communication system 222. In this example, the visited network including mobile communication system 222 and the home network including RAN 204 and packet core network 206 may exchange data and other information using signaling such as IP Exchange (IPX). IPX is a telecommunications interconnection model for the exchange of internet protocol (IP) based traffic between customers of separate mobile and fixed network operators as well as other types of service provider, such as internet service providers (ISP), via an IP based network-to-network interface. In FIG. 2B, an IPX interface 228 connects the visited core 226 of the mobile communication system 222 with the packet core network 206 of the user's home network. The communication between the home network and the visited network or the roaming network is according to defined standards.

In an example, a US cellular user with a home network in the US travels to Canada and attaches to a Canadian network. If the US network operator and the Canadian network operator have a roaming agreement in place, the US user and mobile device 202 can attach to the Canadian network as a roaming network. When the mobile device 202 registers with the Canadian network, the registration is routed back to the home network. In an example, the routing to the home network is referred to as S8 home routing or S8HR. The mobile device 202 registers with the roaming network but gets anchored to the home network packet data gateway as part of the home network's IP multimedia subsystem (IMS) and packet network core. Communication between the mobile device 202 and the roaming network may continue normally.

However, if an application or service such as the MC PTT service is not supported by the roaming network, the attempt to use or access the application or service may fail. The affected applications are generally applications which operate using features of a home network, but which have not been approved to operate on a roaming network. Thus, the mobile device 202 must cooperate with the packet core of the home network, accessed through the roaming network. That is, the mobile device 202 is in radio communication with the roaming network. The roaming network, in turn, is in data communication with the home network over common network connections, such as the public internet or IPX 228.

In an example, a user who used the MP PTT application and whose home network is a US cellular network travels to Canada and attempts to use a Canadian cellular network, such as mobile communication system 222. If a roaming agreement is in place between the two network operators, the user's mobile device can register with the Canadian network as a roaming network or visited network. The user may try to invoke the MC PTT service (or other home network only application) as a roamer. The home network will detect that the user is on a roaming network and determine that the application is not approved for the roaming network. As a result, the request to invoke the MC PTT application will be rejected by the home network.

More specifically in some embodiments, for example, the user activates the mobile device 202 in the area served by the roaming network, mobile communication network 222, located in Canada in this example. The mobile device 202 registers with the roaming network in the conventional manner, attaching to the Canadian network as a roaming network. The user may access the mobile MC PTT application 210 on the mobile device 202. The mobile MC PTT application 212 generates a request 230 to attach to or access the MC PTT service. The request 230 is conveyed over the RAN of the roaming network to the serving gateway (S gateway) of the roaming network, mobile communication network 222. The request 230 is further conveyed over common network connections such as IPX 228 to the packet gateway (P gateway) of the home network, in the US, and then to the IP multimedia subsystem (IMS) core of the packet core network 206 of the home network. The packet core network 206 of the home network includes functionality to determine if this user is permitted to roam to a roaming network with this specific service, the MC PTT service. For example, a default value may be set rejecting any MC PTT service access from outside the home network. Such a default value may be stored in any suitable location such as the Home Subscriber Server (HSS) in an LTE network or the User Data Repository (UDR) in a 5G network, which manages user subscription information for the user and the mobile device 202. Unless the default value is overridden or replaced, the service may not be accessed from a partner network. The radio access network, gateways and other facilities of the roaming network need to support the low-latency requirements of the QCI of the MC PTT service. If the roaming network does in the future support the feature, the service may be accessible to the mobile device 202 on the roaming network and the default setting in the packet core network 206 of the home network may be reset. If the home network concludes that the roaming network does not support the service or application, an attach reject message 232 is returned to the roaming network mobile communication system 222, and to the mobile device 202.

However, this process of requesting the service, verifying availability and receiving a denial back at the mobile MC PTT application 210 of the mobile device 202 can involve substantial delay. For example, many network hops among servers and gateways may be involved in the process. The time delay may be on the order of 600 ms or 1 second between Canada and the US in the example, which can be substantial for a mission critical function requiring minimal mouth-to-ear latency. Delay to another country outside North America may be even longer to learn that the service is not permitted or that access failed. Transmission of the request and receipt of the denial may not be at a QCI or 5QI sufficient to return a rapid response. For a mission critical function, such extended delay is not acceptable. Moreover, every time the device tries to access the application, communication has to proceed through the route from the visited network to the home network.

A particular effective solution is to store information at the mobile device 202. In an example, a table of authorized services or functions and network identifiers may be stored at the mobile device 202. Further, the table may be stored at a Universal Integrated Circuit Card 216 of the mobile device 202. Table 1 illustrates an example PLMN table. In Table 1, a left-hand column indicates networks on which a particular service is allowed for access by the mobile device and a right-hand column indicates networks on which the particular service is not allowed for access by the device.

TABLE 1

| MC PTT Availability per PLMN | |
|---|---|
| Higher 5QI/QCI function allowed | Higher 5QI/QCI function not allowed |
| PLMN A | PLMN X |
| PLMN B | PLMN Y |
| PLMN | PLMN Z |
| . . . | . . . |

In an exemplary embodiment, the table maps network identifiers to services permitted or to services that are blocked or denied for a user of a mobile device. Each communications network is generally referred to as a public land mobile network and is associated with a public land mobile identifier. A public land mobile network (PLMN) is a combination of wireless communication services offered by a specific operator in a specific country. A PLMN typically consists of several cellular technologies like GSM/2G, UMTS/3G, LTE/4G, and 5G, offered by a single operator within a given country, often referred to as a cellular network. A PLMN is identified by a globally unique PLMN code or identifier, which generally consists of a Mobile Country Code (MCC) and Mobile Network Code (MNC). Hence, the PLMN code typically comprises a five- to six-digit number identifying a country, and a mobile network operator in that country, usually represented in the form 001-01 or 001-001. The PLMN code or other identification information may be used to designate networks in which a service is authorized or permitted or blocked.

In the exemplary embodiment of Table 1, the table maps any higher-QCI or 5QI applications that are allowed or disallowed on each respective PLMN according to the PLMN code. Higher QCI or 5QI applications or services that are allowed may be designated in any suitable way. In one example, a higher QCI or 5QI application may have a quality of service (QoS) level exceeding a predetermined QoS threshold. In another example, higher QCI or 5QI applications may be determined by their associated QCI levels. For example, a technical standard designated 3GPP TS 23.203 Policy and Charging Control Architecture define a number of QCI numbers. In an example, a higher QCI or 5QI application may be defined to be an application in the set including QCI-65, QCI-66, QCI-69 and QCI-70. These correspond to mission critical (MC) services, including Mission Critical user plane Push to Talk voice (e.g., MCPTT), Mission Critical delay sensitive signaling (e.g., MC-PTT signaling), and Mission Critical Data. The designated QCI QoS levels may be considered predetermined QoS levels warranting high QoS treatment including low latency. In another example, any service or application that is developed for the home network, by the home network, for subscribers operating on the home network, may have its status entered and stored in the table. Alternatively, in another example, an application with a QoS Class Identifier (QCI) having a priority greater than 2 may be entered in the table. As noted, Mission Critical user plane Push to Talk voice (e.g., MCPTT) has a priority of 0.7 so it is a service or application having a status stored in the table.

In an embodiment, each stored service or application is initially stored with a value of "not allowed." The default condition in this example is that any service or application or function developed for the home network that may be extended to partner networks is that extension to or use on a partner network is not allowed. The default may be overridden upon acceptance of a service for usage from a remote network. Such acceptance may be based on technical agreement, business agreement and other factors between the operator of the home network and the operator of the partner network.

Table 1 illustrates status of availability of a service on remote or roaming networks to a mobile device such as mobile device 202. The mobile device may have access to several public land mobile networks. In example, they are identified as PLMNA, PLMNB, PLMNC, PLMNX, PLMNY and PLMNZ. Any suitable identifiers may be used. Initially, all PLMN networks are disallowed from using the service covered by Table 1. Initially, all networks are stored in the right-hand column of Table 1, indicating that all networks are disallowed for the particular service, such as MC PTT. Over time, the networks PLMNA, PLMNB, PLMNC are moved to the left-hand column to indicate that those networks are approved for accessing the service on a roaming or visiting basis.

In the example, each service or application, such as MC PTT in this example, will have associated therewith a table such as Table 1. The tables may be communicated to the mobile device as each respective service is made available or subscribed by the mobile device or the user associated with the device. For example, when a new service or application is provisioned to the user's account, the provisioning may include a step of automatically providing to the mobile device a new table such as Table 1 for the service. As availability of services changes, the table or tables may be updated to reflect the changed availability.

The form of Table 1 is exemplary only. In other embodiments, any other suitable ways of storing information about allowed or accessible applications or functions or services may be employed. For example, instead of a table storing information about a service and on what networks the service is available, the table instead could store information about a particular network and the services or applications that are available. For example, a table could store, for the network designated PLMN A, all services including MC PTT available on that network. Other optional organizations can be used as well, including combinations which may reduce storage size requirements or decrease amount of time required to access the information.

In some embodiments, Table 1 and other similar information is stored on the UICC or SIM card of the mobile device. The UICC stores related information such as a list of networks or PLMNs which the device is authorized to access, according to a subscription plan or otherwise. The list of accessible networks can be used and copied or adapted to store information such as Table 1. The general memory of the device can also be adapted for the purpose of storing information such as Table 1 but may not offer this same convenience as the UICC. Use of the UICC makes processes of building and maintaining Table 1 information easier for the network operator to do, initially and over time. Using the device memory would require the network operator to consult and cooperate with original equipment manufacturers who design and build the mobile device itself.

The UICC card can be accessed and initialized at the time the mobile device is provisioned with service. When there are updates to service provisioning, including for example changes to services or applications that may be available on a roaming network, the contents of Table 1 or other similar data storage may be updated as well. Further, the contents of the UICC can be accessed and changed by means of over the air updating. In an example, when there is a change to a service or application, the network operator can access the UICC of an individual mobile device over the mobile communication network. For example, in Table 1, if the network identified as PLMN X makes available the MC PTT service through the mobile MC PTT application, the network identifier for PLMN X may be moved from the right column of Table 1 to the left column to indicate the service is allowed. This change may be made by over the air programming.

Figure 2C:
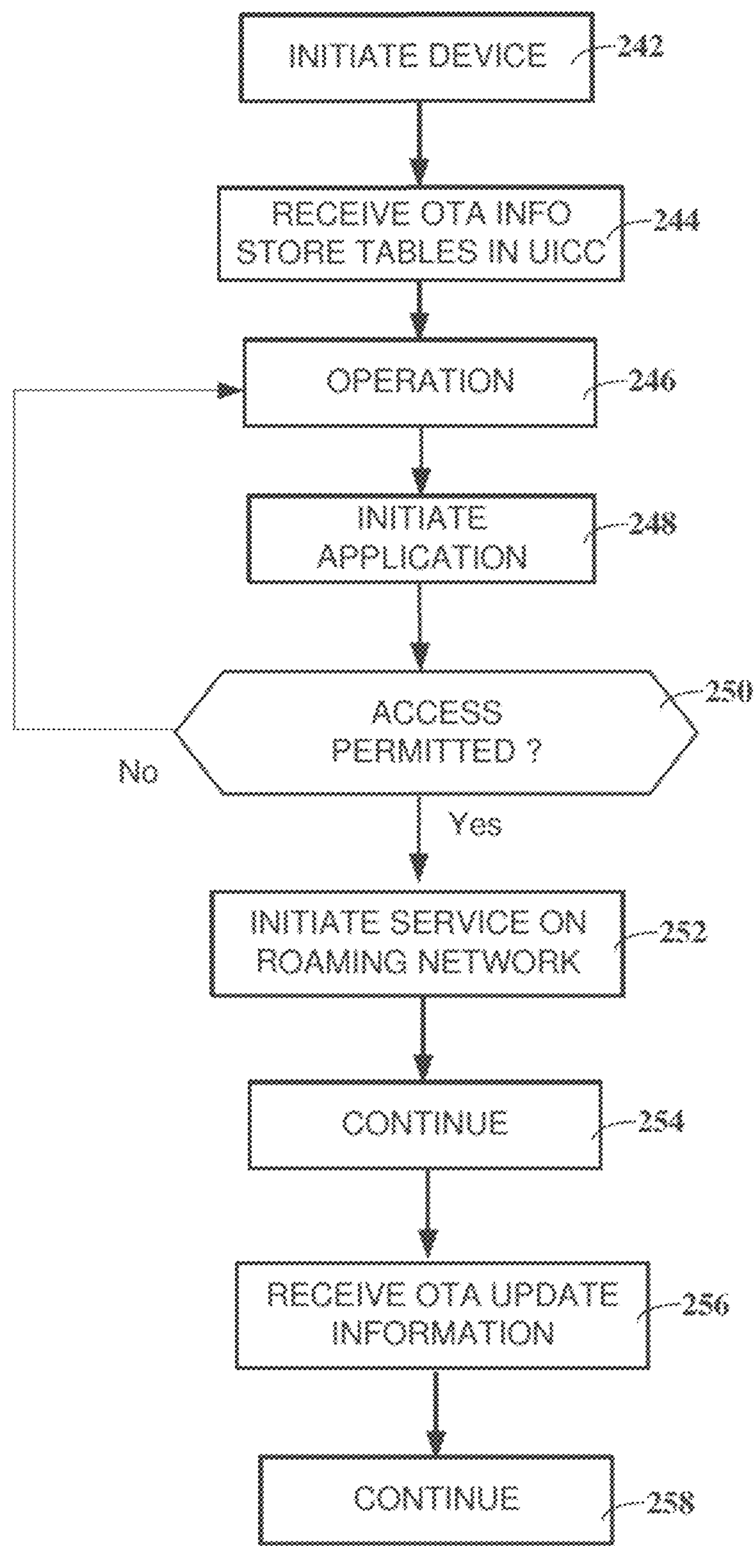
FIG. 2C depicts an illustrative embodiment of a method in accordance with various aspects described herein.

In operation, the contents of Table 1 on the UICC may be consulted before an attempt is made to access a service. FIG. 2C depicts an illustrative embodiment of a method 240 in accordance with various aspects described herein. The method 240 begins at block 242 when operation of a device is initiated. In an exemplary embodiment, the device comprises a mobile device such as the mobile device 202 operable on a mobile communication system such as mobile communication system 200 (FIG. 2A). In other examples, different types of devices and different types of networks may be employed.

Initiation may include, for example, powering on the device and registration for services. The device has a home network operated by a service provider with which the user of the device has a service contract or subscription agreement. Initiation may include powering on the device for subsequent operation by a user. When the device is powered on, the device detects all available networks. The home network operator may have a preferred roaming network or operator or preferred carrier, based for example on existing roaming agreements. The preferred carrier is identified in the UICC of the device, for example, The device compares the list of detected networks and the preferred carrier information stored in the UICC. The device will register with the network of the preferred carrier and will attach to the preferred carrier as a gateway. The preferred carrier will, in turn, confirm with the home network that the device is permitted to roam to the preferred carrier network. Upon completion of initiation, the device is registered on the preferred carrier as a roaming network and on the IP core of the home network.

At block 244, the device receives information over the air (OTA) by means of an OTA system of the home network operator. The device further stores the information in a suitable location of the device. The information may include any suitable information such as registration or provisioning information including information about subscriptions and granted access for the device from the network. The information may be stored in any suitable location on the device such as in non-volatile memory for retention when powered off and for subsequent use.

In particular embodiments, the information received at block 244 includes one or more tables identifying a service and one or more public land mobile networks (PLMNs) with which that service may be used or on which that service may be blocked. The service may be a type of communication or other network capability, such as mission critical push-to-talk capability. The service may include or be accessible through one or more applications such as mobile MC PTT application 210 (FIG. 2A). The information received at block 244 may include programmable code and data defining the application or for use by the application or the application may already be available on the device.

The information of the one or more tables may be organized in any suitable fashion. In the example of Table 1, all services and applications have a default value of "not permitted" for all available PLMNs. The value in the terminal may be updated when a service is available on a particular PLMN. In another example, the information communicated to the device may include only information identifying a service and one or more networks on which the service is available. The information may be stored in a table format or in any other suitable format that may be readily retrieved by the device.

At block 246, the device is in operation. Operation may include any functionality including a voice session, a data session, handover among base stations or eNodeB devices, etc.

At block 248, the method 240 includes initiation of an application or service on the device. Any provisioned service may be activated, for example, by the user or automatically in response to other operation of the mobile device. Further, method 240 may include the launch of an application or app on the device. The application may provide a particular function such as a communication function or data processing function for the device or the user of the device. The application may interact with network features such as a network counterpart application.

Block 248 in some embodiments includes an operation of determining if the application requires a predetermined level of quality of service. This determination can be made in any suitable manner. In one example, a QCI level for the service or the application may be compared with a list of QCI levels given a relatively higher level of QoS. In one example, the list may include QCI-65, QCI-66, QCI-69 and QCI-70. These correspond to mission critical (MC) services, including Mission Critical user plane Push to Talk voice (e.g., MCPTT), Mission Critical delay sensitive signaling (e.g., MC-PTT signaling), and Mission Critical Data. The specified QCI levels may be assembled in a list stored, for example, in the UCCI of the device. When the application or service is initiated, the QCI for the application may be determined and compared with the entries of the list of higher QCI applications. If the QCI for the requested service is on the list, it is determined that the application requires higher QoS processing.

In an example embodiment, the user activates a MC PTT application on the device to begin a push-to-talk session with other group members. The MC PTT application is one of a group of applications that requires very low latency. The MC PTT application is one of a group of applications with a relatively high QCI value or a relatively high 5CI value. For example, the applications in the group may have a relatively high priority such as priority 2 or above. The MC PTT application is one that is approved for use on the home network but may or may not be approved for use on a roaming network. Approval for use on the roaming network depends on technical considerations, such as the ability to support the QCI for the application or the ability to provide the required low latency for the MC PTT function. Approval for use on the roaming network may also depend on business relations between the operator of the home network and the operator of the roaming network.

In a conventional system, when the MC PTT application is opened on the device, the device will try to create a bearer on the roaming network. A bearer is a connection or connection between the device and a packet date network. The device accesses the RAN of the network to request a bearer. The RAN sends a request to the service gateway requesting the bearer for the MC PTT application. The serving gateway consults with the packet gateway of the home network. The packet gateway of the home network queries the Home Subscriber Server (HSS). The HSS stores information about all services and services that are allowed and disallowed or blocked. Initially, the HSS determines that the device is not operating on the home network and concludes that the bearer for the MC PTT cannot be allowed. The HSS signals the packet gateway of the home network with this information. The packet gateway signals the serving gateway of the roaming network that the bearer request cannot be accepted. The serving gateway then signals the RAN that the bearer is rejected, and the RAN informs the device that the bearer is now allowed. The device informs the user that the service failed or is not allowed.

In a system and method in accordance with various aspects herein, this conventional process of checking with the roaming network and the home network for availability of the service can be avoided. At block 250, the method 240 includes a determination if access is permitted to the application, service or functionality initiated at block 248. In embodiments, the device is powered on in the service area of the roaming network, identifies the roaming network to establish a network identification, and registers with the roaming network as a roaming device in the conventional manner. The user opens the MC PTT application or otherwise attempts to access an application that is approved for use on the home network but may or may not be approved for use on a roaming network. In response to the access to the application or other service, the device consults the information stored locally, such as in the UICC of the device. The device uses the network identification for the roaming network to determine if the service is available for that network. The device may consult information such as Table 1, for example. The UICC stores information about whether this application can be allowed or not allowed on the roaming network using the higher QoS, QCI or 5QI. The UICC returns data defining whether the application or service is allowed on the roaming network or not allowed.

If the application or service is allowed for this roaming network, the device will initiate a bearer request in the conventional fashion. However, because the service is allowed, the HSS of the home network will return that the bearer for the service is authorized. That authorization will be reported back to the serving gateway of the roaming network. The service will be initiated using the packet core network of the roaming network.

If the service is not allowed based on the information previously stored in the UICC, the device immediately advises the user and no request for a bearer is initiated. The device may provide a visual, audible or other indication on a user interface of the device to advise the user that the service or application is not permitted. For example, the device may produce on a display screen of the device text message advising that "MC PTT service is not available on the local mobile network." Any suitable indication may be provided. while the user's home network is a cellular network in the US.

Thus, in accordance with some embodiments, when the user attempts to initiate the application or service (such as at block 248), the device may first check the contents of the UICC such as Table 1 to determine the current access permission status. If access to the service is not permitted, storing the current access permission status at the device will reduce the time required to determine the current status from the home network, including multiple router hops and gateway communications back to the home network for information about the status, and a return trip through the network to report the status. This delay may be on the order of 1 second or more which can be problematic for a high latency application like MCC PTT. However, since the device stores the current status locally in the UICC, the device can immediately report the status to the user. Moreover, by storing the status locally, repeated unnecessary network traffic between the roaming network and home network to check on the current status each time the user attempts to access the application can be eliminated. This can free up network resources for other communications.

Thus, use of the device provides a significant technical advantage over the conventional operation. Storing a current access permission status for a high-QoS application locally reduces network traffic. The device and the network operate more efficiently by omitting this additional traffic. In the case of many users attempting to access applications through a roaming network, where the applications have not been approved for use on the roaming network, the reduction in network traffic can be substantial. If the current access permission status for each application at each device is stored locally, the traffic to request application access and receive an access denied message is eliminated. Moreover, in some applications, the home network and the roaming network communicate over third-party networks. Such communication may involve compensation to the third-party network based on volume of data communicated. In such a case, unnecessary traffic to request a service that is disallowed is avoided by relying on locally stored information about the current access permission status.

If, at block 250, access to the application on the roaming network is denied, control returns to block 246 and operation of the device continues. If, however, access to the application is permitted, at block 252, the application or service is initiated on the roaming network. If the process of block 250 involved receiving a current access permission status that was different from what was previously stored at the device, the device may update the stored access permission status to create an updated access permission status. The updated access permission status may be used for subsequent inquiries to further eliminate unnecessary network traffic and delay for the user of the device.

At block 254, the service or application initiated at block 252 continues operation. In the example, an MC PTT application is launched the device and at least one other device of a group of users. The mobile MC PTT application 210 of the mobile device interacts with a core MC PTT application of the core network of the roaming network to provide the MC PTT service. The service at the core network of the roaming network may cooperate with the same service on the core network of the home network, for applications where one or more group members are active on the roaming network and one or more members remain active on the home network.

At block 256, in an optional embodiment, at any time the device may receive an over-the-air (OTA) update from an over-the-air system of the home network. The OTA update may include information about an updated access permission status. The updated access permission status may have changed or been updated to reflect a change in network permissions or other information. For example, when a service such as MC PTT becomes available on the roaming network, the operator of the home network may push out to all devices an update in the access permission status. Alternatively, the operator may push the updated access permission status only to devices which have downloaded the application such as the MC PTT application. The updated access permission status may be used for subsequent inquiries to further eliminate unnecessary network traffic and delay for the user of the device where the updated access permission status indicates access to the application on the roaming network is denied.

The updated access permission status may be stored locally at the device. In an embodiment, the updated access permission status may be written to the UICC or SIM of the device. Any appropriate data structure may be modified or updated. In an example, in Table 1, the network identifier for the PLMN corresponding to the roaming network is updated to reflect the updated access permission status. At block 258, operation continues for the device.

While features of the system have been described here in conjunction with a MC PTT service, it is to be understood that these features may be extended to other services as well, including services and applications that are run on the network core in conjunction with a mobile device application. However, some or all aspects of these techniques may be extended to a wide variety of service. Examples include proximity services and digital multimedia broadcast services including the Evolved Multimedia Broadcast and Multicast Services (eMBMS) offered on LTE networks by AT&T Corp., and other services or applications that a service provider develops for its home network and may extend to other networks. Also, any other mission critical (MC) application, including those that have a different or higher QCI, may benefit from application of aspects of the current disclosure.

In a further example, an autonomous vehicle may store locally, in a UICC, SIM, or similar device, access permission for accessing features on one or more PLMNs. For example, as an autonomous vehicle crosses the border between the US and Canada, or between European countries, some network services or applications may not be available in the coverage area across the border. The autonomous vehicle may consult the locally stored information before requesting access to the service in the roaming network.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
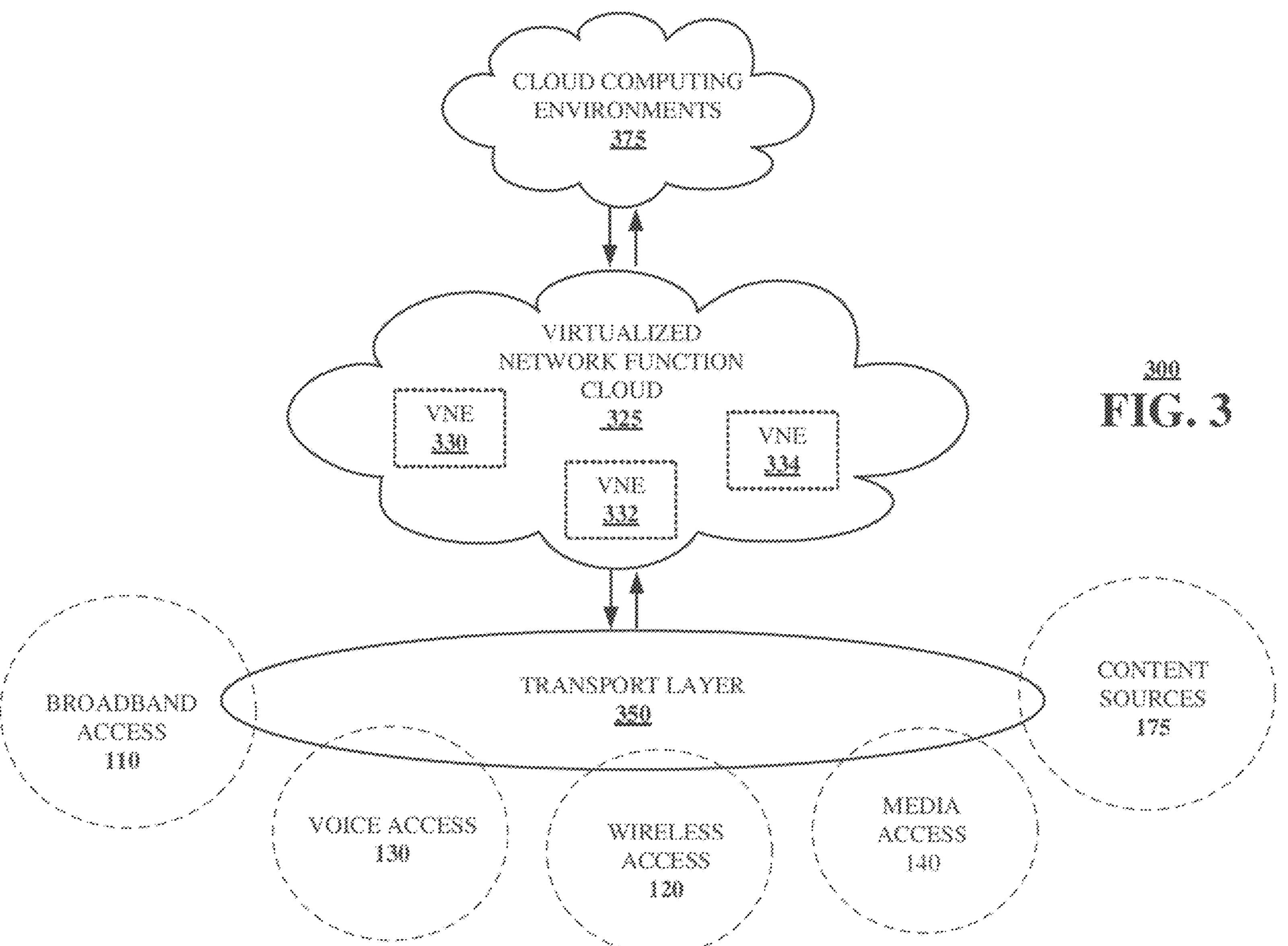
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of mobile communication systems 200, 220, and method 240 presented in FIGS. 1, 2A, 2B, 2C, and 3. For example, virtualized communication network 300 can facilitate in whole or in part a process of registering a mobile device on a roaming network, determining at the local device if an application is not permitted by the home network to run on the roaming network, and suspending access to the application if the application is not permitted on the roaming network.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
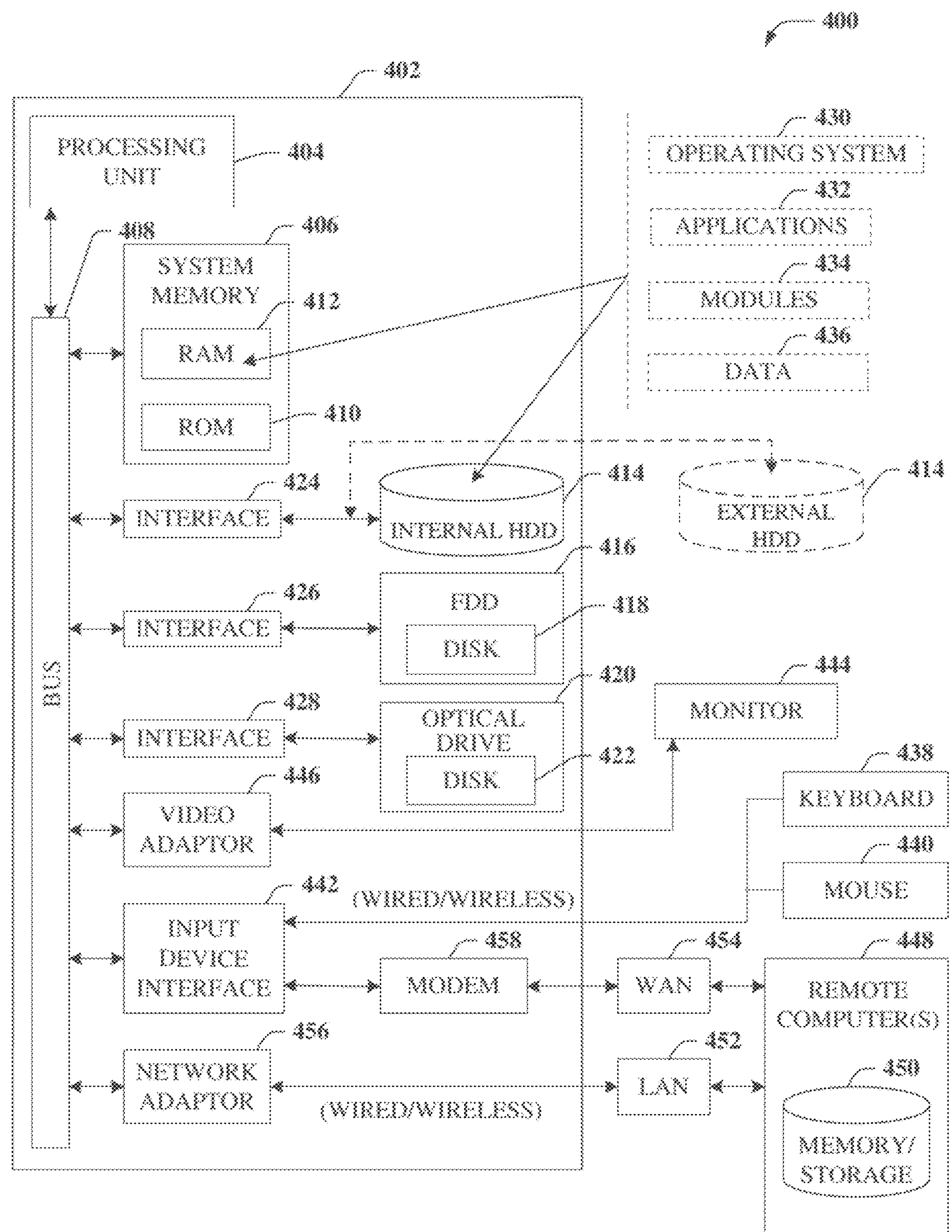
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a process in which a mobile device incorporating in whole or in part the computing environment 400 can register the mobile device on a roaming network, determining from information stored locally at the mobile device if an application is not permitted by the home network to run on the roaming network, and suspend access to the application if the application is not permitted on the roaming network.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
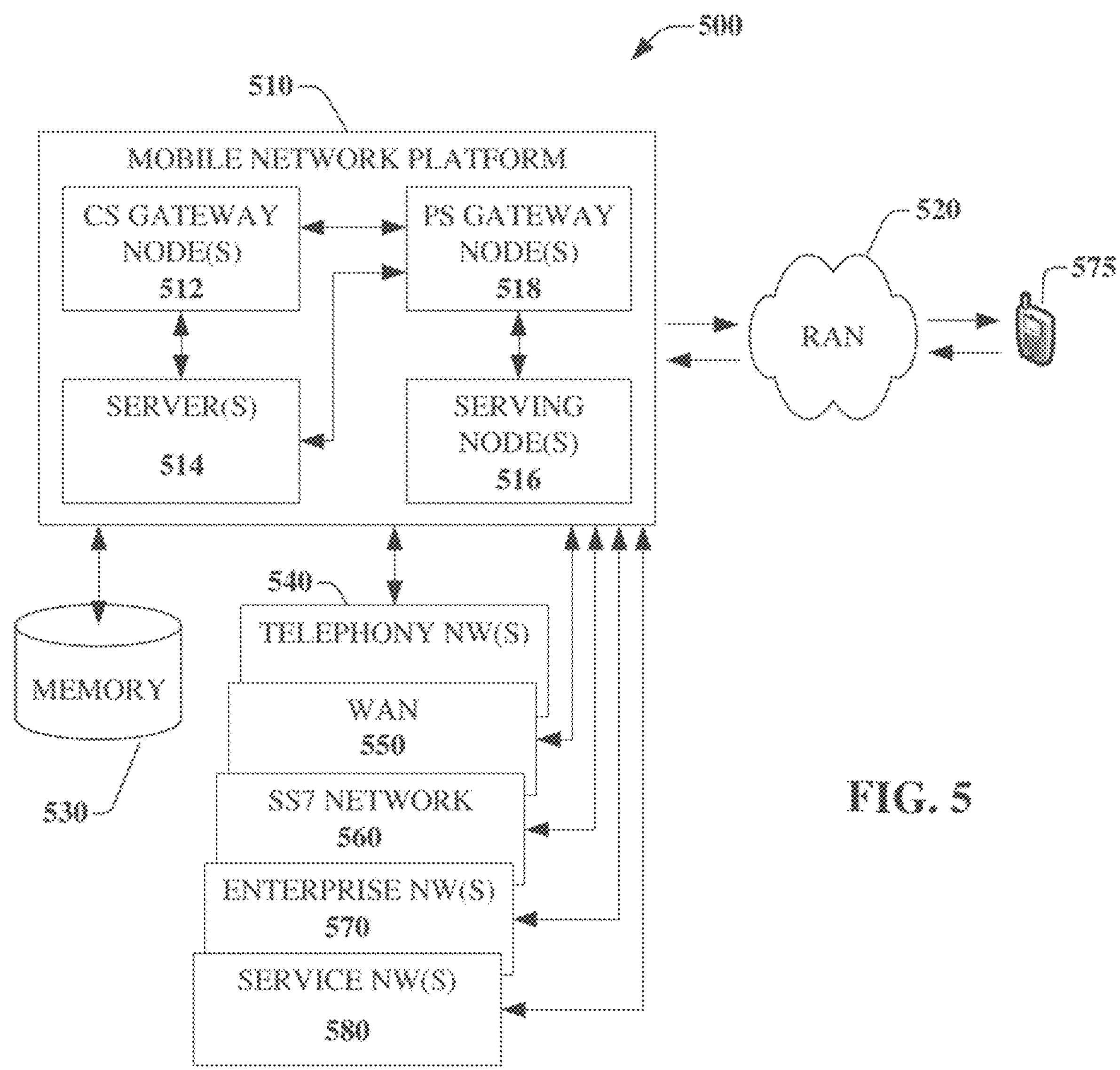
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part a process of registering a mobile device on a roaming network incorporating features such as those included in the platform 510, determining locally at the mobile device if an application is not permitted by a home network to run on the roaming network, and suspending access to the application at the roaming network if the application is not permitted on the roaming network. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flatrate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
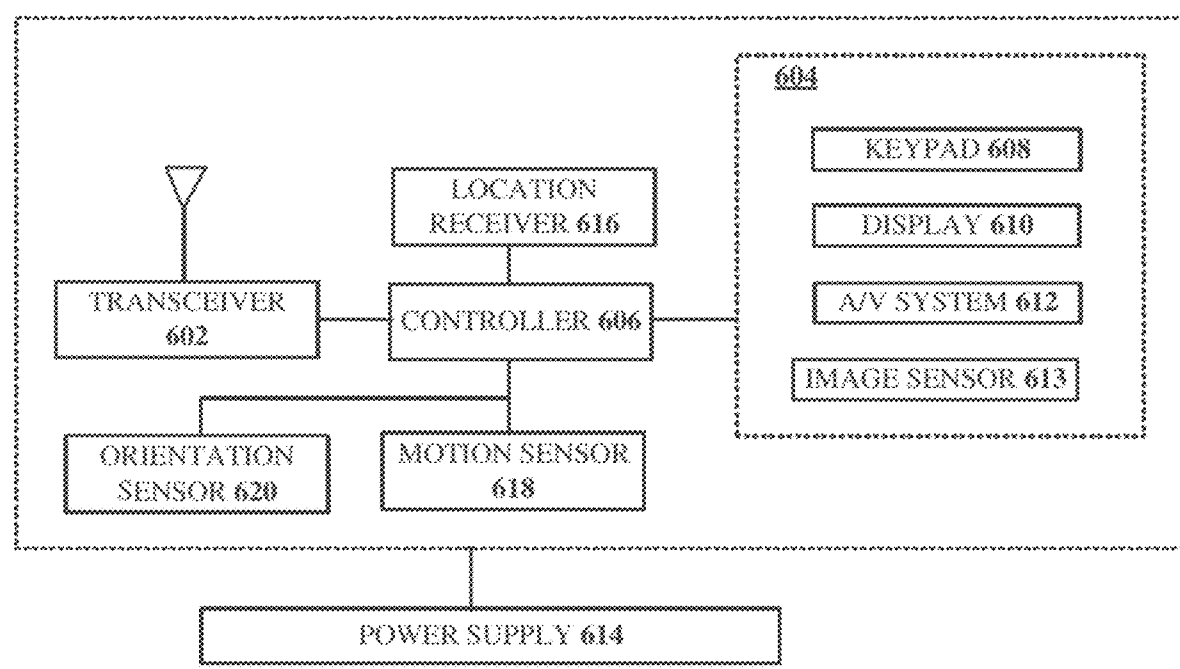
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part implementing a process of registering a mobile device such as computing device 600 for cellular communications on a roaming network, determining based on information stored locally at the computing device 600 if an application is not permitted by the home network of the computing device 600 to run on the roaming network, and suspending access to the application by the computing device 600 if the application is not permitted on the roaming network.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A mobile communication device, comprising:

a processing system including a processor; and a memory that stores executable instructions that, when executed by the processing system, facilitate performance of operations, the operations comprising:

registering with a mobile communication network as a roaming network, wherein the roaming network is in data communication with a home network of the mobile communication device;

detecting initiation of an application at the mobile communication device;

retrieving, from storage of the mobile communication device, permission information which relates one or more applications including the application with a current access permission status for one or more networks including the roaming network; and providing an availability indication to a user of the mobile communication device for a service associated with the application, wherein the providing the availability indication is based on the permission information.

2. The mobile communication device of claim 1, wherein the retrieving the permission information comprises:

determining a network identifier for the roaming network; and determining the current access permission status for the roaming network based on the network identifier for the roaming network.

3. The mobile communication device of claim 1, wherein the operations further comprise:

initiating a bearer request with the roaming network, wherein the initiating a bearer request is responsive to the application having a current access permission status corresponding to permission for the application on the roaming network.

4. The mobile communication device of claim 1, wherein the retrieving the permission information comprises retrieving the permission information from a Universal Integrated Circuit Card (UICC) of the mobile communication device.

5. The mobile communication device of claim 4, wherein the operations further comprise:

receiving the permission information at the mobile communication device from an over the air (OTA) system; and storing, in the UICC of the mobile communication device, the permission information.

6. The mobile communication device of claim 1, wherein the operations further comprise:

receiving updated permission information at the mobile communication device from an over the air (OTA) system of the home network of the mobile communication device, wherein the receiving updated permission information comprises receiving a network identifier and data indicating a network associated with the network identifier has a new access permission status corresponding to denial of the application;

accessing a Universal Integrated Circuit Card (UICC) of the mobile communication device;

in a table stored in the UICC, deleting the network identifier in a first column of the table; and adding the network identifier to a second column of the table, wherein the first column of the table corresponds to networks for which the application has a current access permission status corresponding to denial of the application on the network associated with the network identifier and wherein the second column of the table corresponds to networks for which the application has a current access permission status corresponding to permission of the application on the network associated with the network identifier.

7. The mobile communication device of claim 6, wherein the operations further comprise:

establishing as a default value for the current access permission status, the default value corresponding to denial of the application on all networks; and storing the default value for all networks in the table in the UICC.

8. The mobile communication device of claim 1, wherein the detecting initiation of an application at the mobile communication device comprises detecting initiation of a mission critical push-to-talk (MC PTT) application.

9. A non-transitory, machine-readable medium, comprising executable instructions that, when executed by a processing system including a processor, facilitate performance of operations, the operations comprising:

registering a mobile communication device with a mobile communication network as a roaming network, wherein the roaming network is in data communication with a home network of the mobile communication device;

launching an application on the processing system;

retrieving from storage information about a current access permission status of the application on the roaming network; and providing an availability indication to a user of the mobile communication device for the application on the roaming network, wherein the providing the availability indication is based on the current access permission status.

10. The non-transitory, machine-readable medium of claim 9, wherein the operations further comprise:

suspending further operation of the application to access the roaming network, wherein the suspending further operation is responsive to the current access permission status corresponding to in indication that a service associated with the application is not available.

11. The non-transitory, machine-readable medium of claim 9, wherein the operations further comprise:

initiating a bearer request with the roaming network, wherein the initiating a bearer request is responsive to the application having a current access permission status corresponding to permission for the application on the roaming network.

12. The non-transitory, machine-readable medium of claim 9, wherein the retrieving from storage information about the current access permission status of the application comprises:

accessing a Universal Integrated Circuit Card (UICC) of the mobile communication device; and retrieving the current access permission status of the application from the UICC.

13. The non-transitory, machine-readable medium of claim 9, wherein the operations further comprise:

receiving an updated current access permission status at the mobile communication device; and replacing the current access permission status with the updated current access permission status.

14. The non-transitory, machine-readable medium of claim 9, wherein the operations further comprise:

storing the information about the current access permission status of the application in storage of the mobile communication device, wherein the storing comprises storing the information in a table including identifiers of available public land mobile networks (PLMNs) including the roaming network and respective access permission status information of the application for each available PLMN.

15. The non-transitory, machine-readable medium of claim 9, wherein the launching an application at the mobile communication device comprises launching an application having a relatively high assigned quality of service (QOS) Class Identifier on the roaming network.

16. A method, comprising:

registering, by a processing system including a processor, a mobile device with a mobile communication network as a roaming network, the roaming network in communication with communicating with a home network associated with the mobile device;

initiating, by the processing system, access to a service on the roaming network;

retrieving, by the processing system, information about access permission status of the service for the mobile device on the roaming network; and providing, by the processing system, an availability indication to a user of the mobile device for the service on the roaming network, wherein the providing the availability indication is based on the access permission status of the service.

17. The method of claim 16, wherein retrieving the information about access permission status of the service comprises:

accessing, by the processing system, a Universal Integrated Circuit Card (UICC) of the mobile device; and retrieving, by the processing system, the information about access permission status of the service from the UICC.

18. The method of claim 17, comprising:

retrieving, by the processing system, the information about access permission status of the service from a table storing respective network identifiers for available mobile communication networks and respective access permission status values.

19. The method of claim 16, comprising:

accessing, by the processing system, a Universal Integrated Circuit Card (UICC) of the mobile device; and storing, by the processing system, the information about access permission status of the service in the UICC in a table, the table containing respective network identifiers for available public land mobile networks (PLMNs) and respective access permission status values for each respective PLMN of the PLMNs.

20. The method of claim 16, comprising:

receiving, by the processing system, updated information about access permission status from an over the air (OTA) system of the home network of the mobile device, wherein the receiving updated information about access permission status comprises receiving a network identifier and data indicating a network associated with the network identifier has a new access permission status corresponding to permission for access to the service on the roaming network by the mobile device.

* * * * *